June 23, 1959    R. H. JOSEPHSON ET AL    2,891,826
SELF-ALIGNING BEARING
Filed Jan. 31, 1955    2 Sheets-Sheet 1
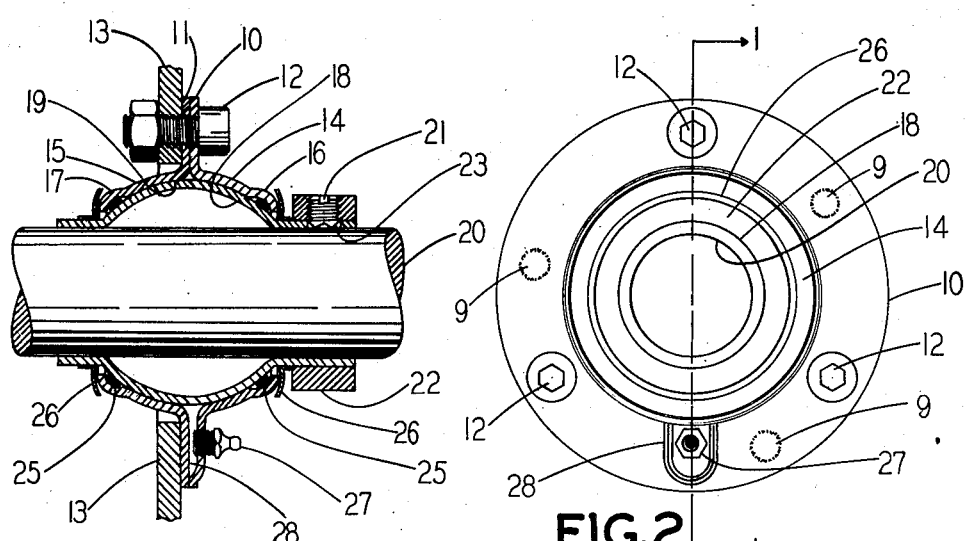
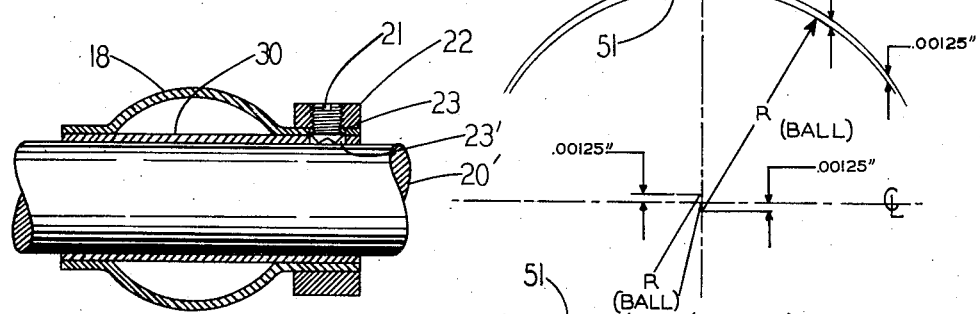
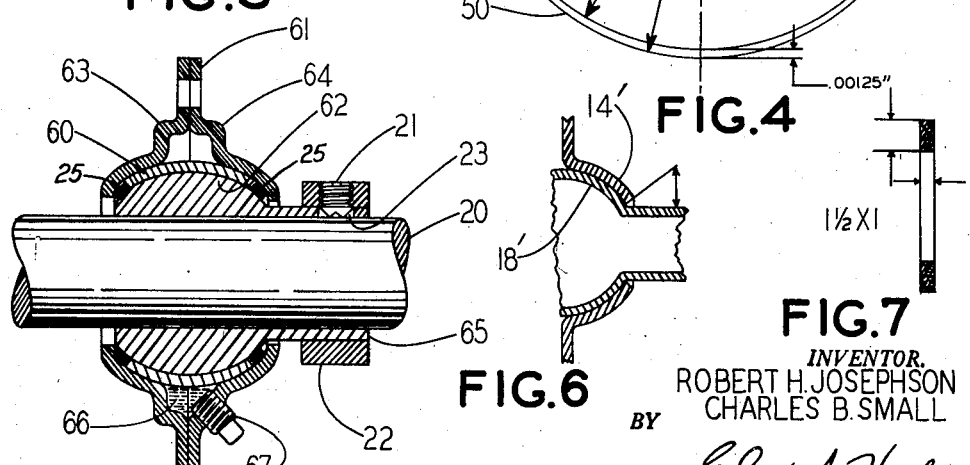
INVENTOR.
ROBERT H. JOSEPHSON
CHARLES B. SMALL
BY
*Elbert J. Hyde*
ATTORNEY June 23, 1959          R. H. JOSEPHSON ET AL          2,891,826
                        SELF-ALIGNING BEARING
Filed Jan. 31, 1955                              2 Sheets-Sheet 2
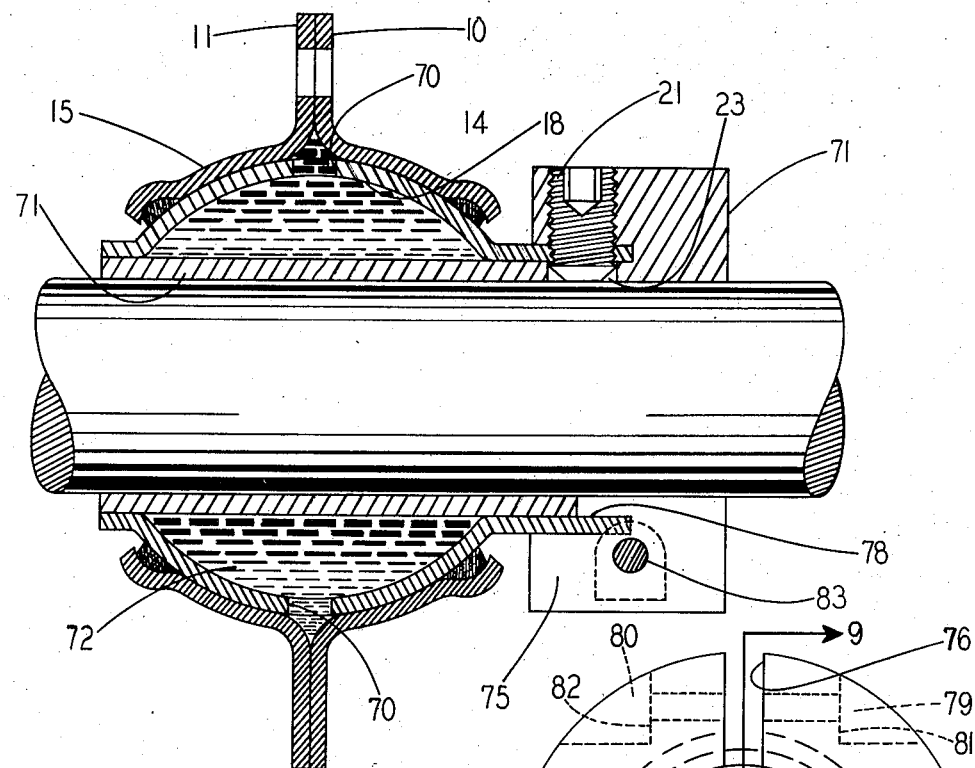
FIG.8
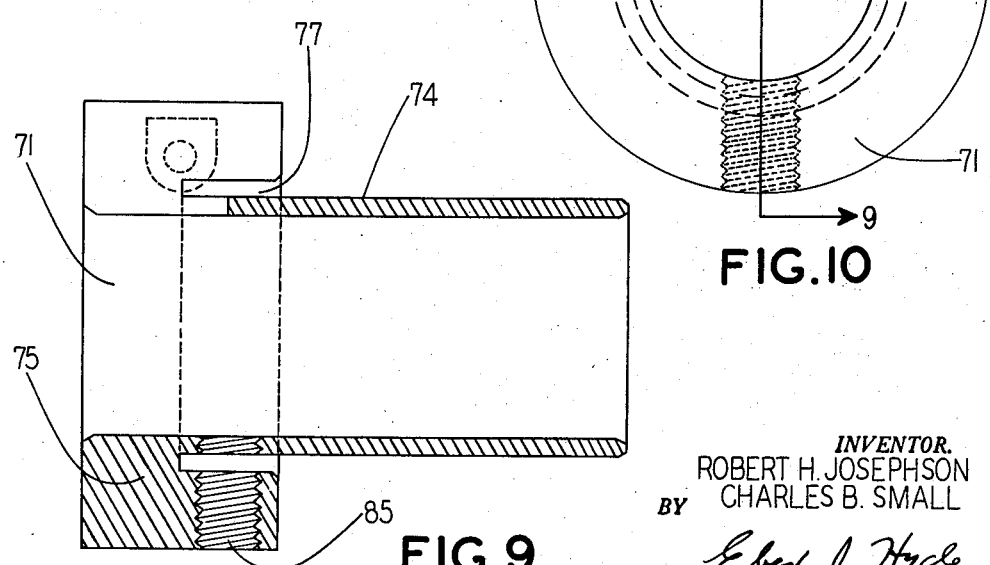
FIG.9                                    FIG.10
INVENTOR.
ROBERT H. JOSEPHSON
CHARLES B. SMALL
BY
Eber J. Hyde
ATTORNEY

United States Patent Office 2,891,826
Patented June 23, 1959

2,891,826

SELF-ALIGNING BEARING

Robert H. Josephson, Cleveland Heights, and Charles B. Small, Euclid, Ohio, assignors to Clevite Corporation, Cleveland, Ohio, a corporation of Ohio Application January 31, 1955, Serial No. 485,056

3 Claims. (Cl. 308—72)

This invention pertains to a self-aligning bearing.

There exists at the present time a need for a good, inexpensive self-aligning bearing which will provide for a limited amount of misalignment of the axis of the bearing with respect to the axis of a rotatable shaft mounted in the bearing, and which will provide for rotation of the shaft with respect to the bearing.

In the past many attempts have been made to provide for relative rotation and for misalignment of a shaft with respect to a bearing, and many of these prior attempts have utilized the ball-and-socket principle. In these prior devices the ball-and-socket provided for adjustment of the misalignment and a separate bearing provided for the rotation of the shaft with respect to the stationary part of the bearing.

It is an object of the present invention to provide an inexpensive, yet rugged, self-aligning bearing for a rotatable shaft wherein the relative motions in the bearing due to misalignment and due to rotation of the shaft take place between the same bearing surfaces.

A further object of the present invention is to provide a self-aligning bearing wherein relative motion due to misalignment and relative motion due to rotation of a shaft take place between the same bearing surfaces, and to provide for large area contact between these surfaces.

Another object is to provide a self-aligning bearing which is useful with shafts having different size diameters.

For a better understanding of the present invention, together with other and further objects thereof, reference is had to the following description taken in connection with the accompanying drawings, and its scope will be pointed out in the appended claims.

With reference to the drawings there is shown in Fig. 1 a cross-sectional view taken along line 1—1 of Fig. 2, showing a self-aligning bearing of the invention.

Figure 2 is an end view of the device shown in Fig. 1; Figure 3 is a cross-sectional view of a portion of a modified device; Figure 4 diagrammatically illustrates a principle embodied in the device; Figure 5 is a cross-sectional view of a modified form of the invention; Figure 6 is an enlarged view showing a detail of the unit; Figure 7 is a sectional view of the seal used in the device; Figure 8 is a sectional view of a modified form of the invention; Figure 9 is a sectional view of a part of the device shown in Fig. 8 taken along line 9—9 of Fig. 10, and Figure 10 is an end view of the part shown in Fig. 9.

With reference to Figure 1 the self-aligning bearing of the invention comprises a first annular flange member 10 and a second annular flange member 11 each having their outer portions connected together in parallel face-to-face relationship by means of bolts, spot welds, peened over dowels 9, or the like. Bolts 12 secure the self-aligning bearing device to a sheet metal partition 13 or to a pillow block base.

Each of the two annular flange members 10, 11 in addition to the outer connected-together portions, has an inner truncated spherical portion 14, 15, respectively, which extends outwardly away from the other flange member, and the two portions 14, 15 together form a concave truncated spherical bearing section or socket. Both of the outer edges of this truncated spherical bearing section are raised slightly at 16, 17. The inner surface of the socket may be suitably grooved to facilitate the distribution of oil or grease within the unit.

An internal member 18 comprises a truncated spherical bearing section, the outer convex surface 19 thereof being in bearing engagement with the inner concave surfaces of the two flange members 14, 15. Preferably one of the contacting surfaces is comprised of, or is coated with, a bearing material; that is, either the concave spherical surfaces of flange members 14, 15 or the convex spherical surface 19 of the internal member 18, or both, may be made of bearing material, or may be formed of a hard material such as steel coated with a bearing material.

The shaft 20 which is to turn within the self-aligning bearing is secured to the internal bearing member 18 by one or more set screws 21 extending in threaded engagement through the collar 22 and through hole 23 in an extension of the internal bearing member 18. Thus the shaft 20 is secured to the internal bearing member 18 causing the internal bearing member 18 to rotate as the shaft 20 rotates. The external bearing members 14, 15 are connected to the frame 13 or the like by means of bolts 12 through the flange 10, 11 and therefore do not rotate. Accordingly, relative motion due to rotation of the shaft 20 takes place between the internal and external spherical bearing members 18, and 14, 15. For this reason either the outer convex surface 19 of the inner bearing member 18 or the inner concave surfaces of the outer bearing members 14, 15, or both, are made of bearing materials such as babbitt, copper-lead etc.

Between the inner and outer bearing members at the location of the raised outer edges 16, 17 of the bearing members 14, 15 there are grease seals 25, and closely adjacent to the raised terminal edges 16, 17 of the bearing members 14, 15 are grease slingers 26 mounted on an axial extension of the inner bearing member 18. A grease fitting 27 is connected to the flange 10 of the outer bearing member 14 at a location where a grease groove 28 is provided. The groove 28 extends between the two outer bearing members 14, 15 to a location between the bearing members 18 and 14, 15. Thus the entire surface area of the inner and outer bearing members which engage each other may be lubricated. For certain services the grease groove 28 and fitting 27 may be eliminated and a sealed built-in grease supply provided.

An advantage of the self-aligning bearing of the present invention is that it can be utilized for shafts of different diameters. This greatly increases the number of applications where the self-aligning bearing is applicable and leads to reduced costs through increased production. Previously a special self-aligning bearing had to be produced for each shaft diameter.

Figure 3 shows a shaft 20' of diameter slightly smaller than the diameter of the shaft 20. A bushing 30 is slipped over the shaft 20', and hole 23' in the bushing registers with hole 23 in the inner bearing member 18. Thus the set screw 21 extending through collar 22 secures both the inner bearing member 18 and the bushing 30 to the shaft 20'.

In the past ball and socket devices have been utilized to provide for the misalignment between a shaft and a bearing, the ball and socket device accommodating the misalignment and some other bearing device accommodating the relative rotation between the shaft and the ball and socket device. In these prior ball and socket devices the diameter of the outer surface of the ball was slightly less than the diameter of the inner surface of the socket, thereby to get good nesting of the ball in the socket. This apparently was satisfactory where the only motion between the ball and the socket was due to misalignment, but in the present device where the rotation of the shaft 20 with respect to the flange 13 takes place between the ball and the socket it was highly undesirable to make the ball slightly smaller than the socket. To do so provides poor area of contact between the two bearing surfaces, thereby leading to accelerated wear on the relatively moving parts. It has been discovered that it is much more satisfactory to make the portions of the ball, or inner bearing member 18, which engage the outer bearing members 14, 15 of the same radius but having an off-set center from the center of the arcs which define the inner bearing surface of the outer bearing members 14, 15.

Figure 4 illustrates this construction. The outer arcs 50 represent the inner bearing surfaces of the outer bearing members 14, 15 (the socket), and the inner arcs 51 represent the outer bearing surface of the inner bearing member 18 (the ball). It is desired that the running clearance between the ball and the socket during operation should be .0025 inch diametral. Accordingly the center of the lower arc 51 is raised above the center of the arc 50 by .00125 inch, and the center of the upper arc 51 is below the center of the arc 50 by .00125 inch. It has been found that this structure provides better bearing contact over a much wider area than utilization of a ball and socket of different radii and the same center. With the present structure the clearance between the ball and the socket at all points measured along lines perpendicular to the horizontal center-line is always .00125 inch.

Figure 5 shows an alternative form of the invention wherein an intermediate bearing member 60 is interposed between the cup-shaped housing 61 and the spherical ball shaped member 62 which is secured to the rotating shaft 20. The device is somewhat similar to the self aligning bearing shown in Fig. 1 in that the housing 61 is formed of two halves 63, 64 which are permanently secured together, or which may be secured together by the bolts which hold the unit onto a flange or the like. The truncated spherical member 62 may be hollow, as shown in Fig. 1, or it may be solid as shown in Fig. 5, and it has an extension 65 which is connected securely to shaft 20 by means of set screw 21 extending through the collar 22 and through hole 23 in the extension 65. Grease seals 25 are provided adjacent the ends of the bearing member 60 and between the spherical member 62 and the two housing halves 63, 64 to prevent the exodus of grease from the unit. A large grease chamber 66 is provided entirely around the unit and a grease fitting 67 is secured to housing portion 64 for supplying grease to the grease chamber 66. The bearing 60 preferably is comprised of two similar truncated hemispherical members. These two bearing members are formed entirely of bearing material, or they may be formed of a steel backing member whose convex and concave surface areas are coated with bearing material, as is known in the art. The two bearing halves form an annular bearing which is positioned between the ball member 62 and the socket formed by the two housing halves 63, 64, and as the ball member 62 rotates with the shaft 20 relative motion takes place across the bearing member between the ball member 62 and the socket formed by the housing members 63, 64. In the bearing device shown in Fig. 5 the relative motion may take place between the ball member 62 and the bearing 60, in which event either the convex surface of the ball 62 or the concave surface of the bearing member 60 or both surfaces may be comprised of bearing material; or the relative motion may take place between the bearing member 60 and the housing 63, 64, in which event the outer convex surface of the bearing member 60 or the concave surfaces of the housing halves, or both, may be comprised of bearing material. It is also within the scope of the invention for relative motion to take place at all of the locations where convex and concave surfaces are in engagement, in which event all of the surfaces would be comprised of bearing material.

Figure 6 is a sectional view of a portion of a modified device wherein the truncated spherical portion 14' which nests around the internal member 18' preferably is not raised, as at 16 in Fig. 1, for a dirt seal. The end of the spherical portion 14' is closely adjacent to the extended portion of the internal member 18' and terminates at an angle to the axis of the member 18'. It has been discovered when the end of the spherical portion 14' is close to the extended portion and terminates parallel to the axis of the member 18' that dirt packs between these two relatively moving members and causes accelerated wear. While Figure 6 has been illustrated without a dirt sealing ring it is to be understood that such a ring may be utilized.

The preferred dirt sealing ring for the embodiments shown in Figures 1 and 6 is shown in detail in Fig. 7, and comprises an annular ring of felt or the like. The dimension of the face of the ring between the internal diameter and the outer diameter should be about 1½ times the thickness of the ring. When in place, as shown in Figure 1, the seal is a truncated cone and occupies virtually the entire space between the raised portion 16 and the spherical member 18 to exclude all dirt.

Figures 8, 9 and 10 show a modified form of the invention. The two annular flange members 10 and 11 are connected together by spot welds 9 as shown in Fig. 2, or by other suitable means, and include truncated spherical portions 14, 15, respectively, and are otherwise similar to the flange members shown in Figs. 1 and 2. An internal member 18' is in bearing engagement with the two spherical portions 14, 15. The outer surface of internal member 18' or the inner surfaces of the spherical portions 14, 15 are formed of bearing material since the relative rotation and the motion due to misalignment occur between the internal member 18 and the spherical portions. Internal member 18' differs from internal member 18 shown in Fig. 1 by having one or more openings 70 extending from the interior of the member 18' to the outside thereof.

A bushing 71 made of nylon or other such material is provided to serve the same purpose as the bushing 30 in Figure 3, that is it acts as a spacer so that a self-aligning bearing of given size can be used with shafts of several different sizes. In addition the nylon bushing 71 acts as a seal so that a large quantity of grease may be maintained in the reservoir space 72. A grease fitting similar to fitting 27 in Fig. 1 may be applied to the device of Fig. 8. The grease in space 72 communicates with the bearing surfaces through openings 70.

The nylon bushing 71 is shown in detail in Figures 9 and 10, and comprises a tubular portion 74 whose outer diameter is such that it seals against the inner wall of the internal member 18' to prevent the grease therebetween from escaping. Integral with the tubular portion 74 is a collar 75 which is split axially at 76 and which has a deep groove 77 to receive the end 78 of the internal member 18'. The collar 75 is notched at two locations 79, 80 adjacent the split 76 to provide shoulders 81, 82 against which the head of a clamping screw 83 or other such clamping member bears to squeeze the collar tightly around the end of the internal member 18' which is inserted in the slot 77. A threaded hole 85 extends through the collar 71 and a set screw 21 is in threaded engagement with the collar and extends to the shaft 20 within the bushing 71 for securing the collar, the internal bearing member 18' and the plastic bushing 71 to the shaft 20. It is preferable in many installations to have both the set screw 21 and the clamping screw 83. However, for some uses the set screw 21 may be used alone, and for other applications the clamping screw 83 alone may be preferred.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

We claim:

1. A self-aligning bearing for a rotatable shaft comprising, first and second annular flange members having their outer portions connected together in parallel face-to-face relationship and adapted to be connected to a support and each having its inner portion extending outwardly away from the other flange member, said inner portions together forming a concave, truncated spherical bearing section terminating in outer edges; an internal member having a spherical bearing section the outer convex surface thereof in bearing engagement with the concave truncated spherical bearing section of said first and second annular flange members, one of said spherical bearing sections at the locations where it is in engagement with the other bearing section being comprised of frictional bearing material, means for securing said internal member to said rotatable shaft, sealing means located between the outer edges of the first and second annular bearing housing members and said internal member for sealing said bearing surface means against dirt; and a pair of slinger means mounted on said internal member for rotation therewith adjacent said outer edges of said first and second housing members.

2. A self-aligning bearing as set forth in claim 1, further characterized by the radius of said truncated spherical bearing section and the radius of the spherical section of the internal member being equal, the center of the radius of the spherical section of said internal member being offset from the center of the radius of said truncated bearing section.

3. A self-aligning bearing as set forth in claim 2, further characterized by the amount said centers are offset being equal to one-half the desired amount of running clearance between said spherical section of the internal member and said spherical bearing section when there is no relative load between them.

References Cited in the file of this patent

UNITED STATES PATENTS

| | | |
|---|---|---|
| 1,532,608 | Szekely | Apr. 7, 1925 |
| 1,606,747 | Carter | Nov. 16, 1926 |
| 2,012,461 | Wyrick | Aug. 27, 1935 |
| 2,047,885 | Riebe | July 14, 1936 |
| 2,259,881 | Foley | Oct. 21, 1941 |
| 2,653,064 | Heim | Sept. 22, 1953 |
| 2,676,853 | Shafer | Apr. 27, 1954 |
| 2,711,352 | Hasko et al. | June 21, 1955 |